United States Patent [19]
Duncan

[11] Patent Number: 5,174,125
[45] Date of Patent: Dec. 29, 1992

[54] DEVICE FOR DETECTING LOSS OF REFRIGERANT IN AN AIRCONDITIONER

[76] Inventor: Donald Duncan, 77 Colonial Avenue, Scarborough, Ontario, Canada, M1M 2C4

[21] Appl. No.: 734,978

[22] Filed: Jul. 24, 1991

[51] Int. Cl.⁵ .................... G01K 13/00; G01N 7/00
[52] U.S. Cl. .................................... 62/129; 73/19.03
[58] Field of Search ............ 165/11.1; 73/40.5 A, 73/19.03; 62/129, 126

[56] References Cited

U.S. PATENT DOCUMENTS

| | | | |
|---|---|---|---|
| 4,235,095 | 11/1980 | Liebermann | 73/19.03 X |
| 4,392,374 | 7/1983 | Liebermann | 73/19.03 |
| 4,418,565 | 12/1983 | St. John | 73/19.03 |

*Primary Examiner*—William E. Wayner
*Attorney, Agent, or Firm*—Jeffrey T. Imai; Arne I. Fors; D. Doak Horne

[57] ABSTRACT

An apparatus for detecting a deficiency in refrigerant in a refrigeration system is disclosed. The apparatus has an extension arm for mounting onto a refrigerant line downstream of the expansion valve. The extension arm is cantilevered for amplifying the vibrations of the refrigerant system when deficient in refrigerant. Mounted on the extension arm is an accelerometer for detecting this vibration and sending an electrical signal upon detection thereof. Electrically connected to the accelerometer is a signalling device for providing a warning or alarm signal of a deficient refrigerant situation.

7 Claims, 1 Drawing Sheet

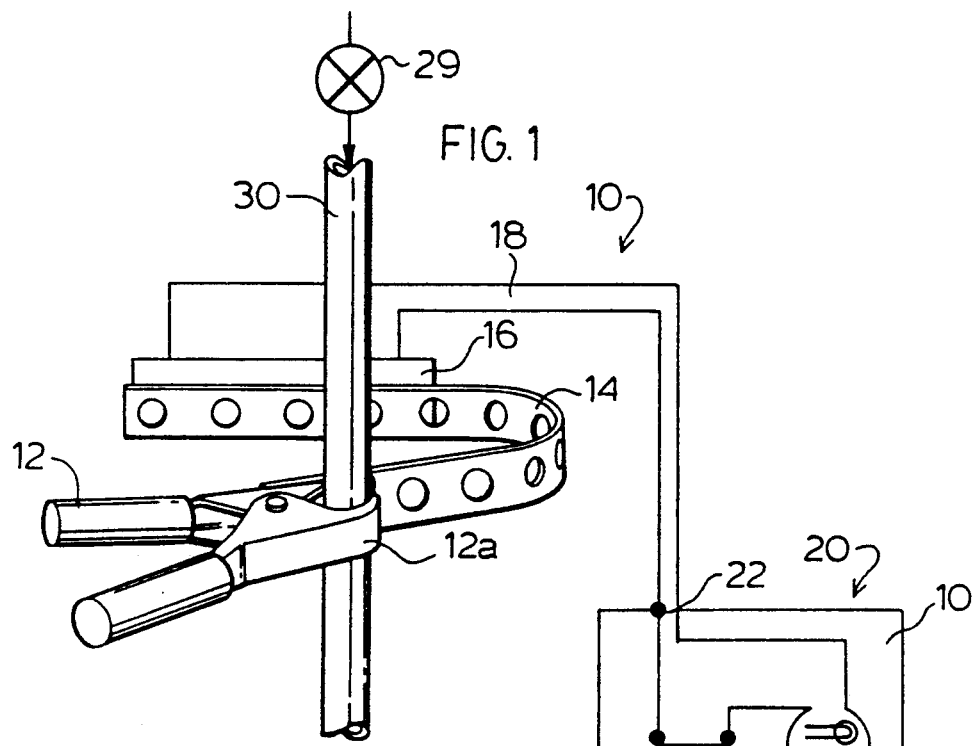
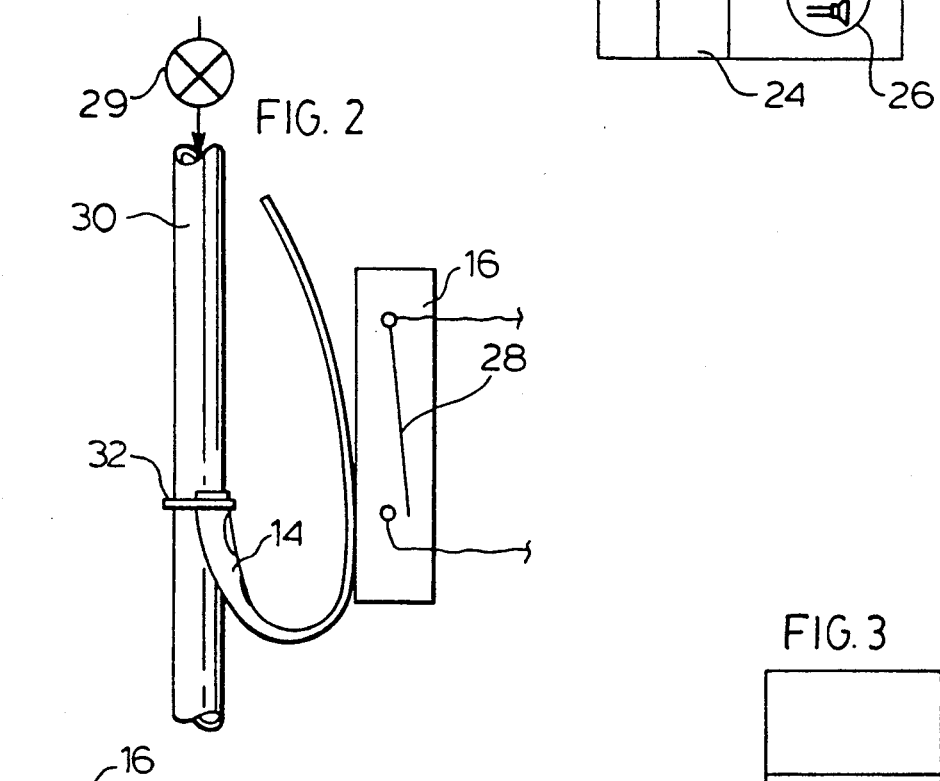
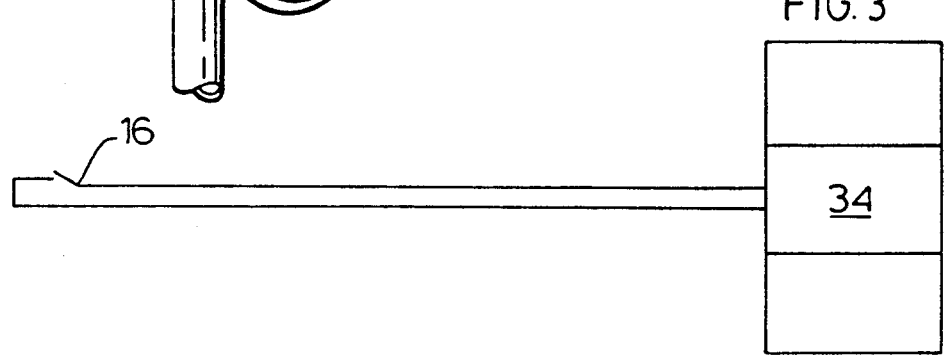

DEVICE FOR DETECTING LOSS OF REFRIGERANT IN AN AIRCONDITIONER

FIELD OF INVENTION

This invention relates to a device for detecting a deficiency of various types of refrigerants that are used in air conditioning systems and commercial refrigeration equipment. In particular, the invention relates to a device having an adjustable vibration switch connectable to a direct expansion system for detecting leakage of refrigerants.

BACKGROUND OF INVENTION

Air conditioning systems and refrigeration equipment use freon refrigerants to facilitate the necessary heat Chlorofluorocarbons (C.F.C.) used in freon refrigerants are suspected of causing harmful effects to the environment.

Most commercial air conditioning and refrigeration units are equipped with a sight glass installed in the refrigerant liquid line as a visible means of checking proper refrigerant charge. These glasses are generally in a remote area and quite often ignored until the system has lost large quantities of refrigerant and have stopped cooling.

The standard refrigeration system whether in an air conditioner, refrigeration system or heat pump, generally comprises a closed system for carrying a refrigerant such as freon through a refrigeration line. The refrigeration system generally comprises a pump for pumping the liquid refrigerant through a line to an expansion or evaporation valve for vaporising the refrigerant, the vapour refrigerant is then passed through a coiling coil which is in the area to be cooled, then passed through a line into a condenser to condense the vapour into a liquid which can passed through a line back to the pump, thereby completing the refrigeration cycle.

A closed refrigeration system theoretically does not lose any refrigerant as the refrigeration cycle is repeated. However, in practice, air conditioners and refrigerators continuously lose refrigerants through the various joints in the pipes. Normally, the loss of refrigerant takes place over many years.

The detection of leaks in refrigeration equipment is a major problem both manufacturers and service technicians. Several methods of leak detection has been used.

An electronic detector is widely used in manufacturing and assembly of refrigeration equipment for detecting leaks in the refrigeration system. The operation of the instrument depends on the variation in current flow due to ionization of decomposed refrigerant between two oppositely charged platinum electrodes.

A halide torch has been used for many years as a fast and reliable method of detecting leaks of halogenated refrigerants. Air is drawn over a copper element heated by methyl alcohol or a hydrocarbon flame. If halogenated vapours are present they will be decomposed and the colour of the flame will change to bluish-green. Although not as sensitive as the electronic detector, this method is suitable for most purposes Applicant has found that when the amount of refrigerant drops below a critical level, a small vibration will be generated at or downstream of the expansion valve of the refrigeration system. The onset of this vibration occurs well in advance of the failure of the air conditioning unit or the refrigeration system to provide adequate amount of cooling.

It is therefore an object of this invention to provide an apparatus to provide an early warning of leakage of refrigerant.

It is further object of this invention to provide an apparatus for early detection of improper condensing of refrigerant.

According to one aspect of the invention there is provided an apparatus comprising an extension arm for mounting onto a refrigerant line downstream of the expansion valve. The extension arm is cantilevered for amplifying the vibrations of the refrigerant line when deficient in refrigerant. Mounted on the extension arm is an accelerometer for detecting this vibration and sending an electrical signal upon detection thereof. Electrically connected to the accelerometer is a signalling device for providing a warning or alarm signal of a deficient refrigerant situation.

DETAILED DESCRIPTION OF DRAWINGS

In drawings which illustrate the embodiment of the invention,

FIG. 1 is an illustration of the clip and circuit diagram of the preferred embodiment, FIG. 2 is an illustration of the clip of the preferred embodiment bolted to a refrigerant line, and FIG. 3 is a circuit diagram of the preferred embodiment connected to a computerized system for controlling and monitoring the refrigeration system.

DETAILED DESCRIPTION OF THE PREFERRED EMBODIMENT

The detection apparatus of the present invention is generally illustrated in FIG. 1 as 10. Apparatus 10 generally comprises clips 12, U-shaped extension arm 14, accelerometer 16, conductors 18, which is connected to box 20 which houses the detection circuitry.

Clips 12 can be any variety of clips having pivotally connected arms and a biasing means urging the two arms together at one end. Battery clips have been found to be ideal for the present invention.

Extension arm 14 is rigidly attached to one arm of clip 12 so that extension arm 14 is cantilevered to the remote end 12a of arm 12. At the distal end of extension arm remote from remote end 12a of arm 12, accelerometer 16 is affixed. Accelerometer 16 can be type of known devices which can detect motion and generate an electrical signal in response thereto.

In the preferred embodiment accelerometer 16 is an open switch arm 28 which is hingedly attached at one end as illustrated in FIG. 2 and slightly biased in an open position. Switch arm 28 has a mass substantially less than that of extension arm 14 permitting switch arm to open and close in response to a vibration being applied due to the differences in inertial response between switch arm 28 and the extension arm 14 as the extension arm 14 is vibrated.

The detection circuitry comprises a main power switch 22 connected to a power source 24, connected to a signalling device 26. Power source 24 could a battery or a low voltage transformer powered from a standard AC power supply. Signalling device 26 could be a bell, buzzer, light or and other warning signal or any combination thereof. Switch 22 is a main power on off switch for the apparatus.

In use, clips 12 are applied to refrigerant line 30 until clips 12 firmly grip the line. Clips 12 must be placed a short distance downstream of the expansion valve 29 of the refrigeration system.

When the level of refrigerant drops below a critical level, small vibrations are generated downstream of the expansion valve which are normally undetectable. The minute vibrations are transmitted to the clips 12 and then to extension arm 14, which will in turn be vibrated. The largest deflections will be observed at the remote end of extension arm 14. More significantly, the vibrations are now detectable on extension arm 14.

When a vibration is applied to extension arm 14, extension arm 14 will accelerate at a different rate than relay 28 causing relay 28 to close and open the contact rapidly. As can be seen from FIG. 1 and 2, when relay 28 opens and closes and switch 22 is also closed, an open and closed circuit is established causing signalling device 26 to flash or chirp as the case may be, providing a warning that the refrigerant in the system has dropped below the critical level.

During the periods the refrigeration system start ups and until the systems achieves a steady state, small vibrations may also be generated. The detection apparatus 10 will detect such vibrations during this period. However, the alarm signal may be disregarded unless the alarm signal continues for more than approximately five minutes.

As illustrated in FIG. 2, the device 10 could be semi-permanently installed onto the refrigerant line 30 by bolting extension arm 14 directly thereto by circular clip 32.

FIG. 3 illustrates the device connected to a computerized monitoring system 34 which is used to control and monitor the refrigeration system. It is apparent that the invention can be modified to be included in existing refrigeration systems.

However, since many other modifications and purposes of this invention become readily apparent to those skilled in the art upon perusal of the foregoing description, it is to be understood that certain changes in style, size and components may be effective without a departure from the spirit of the invention and within the scope of the appended claims.

The embodiments of the invention in which an exclusive property or privilege is claimed, are defined as follows:

1. A device for detecting a deficiency of refrigerant in a refrigeration system, said device comprising
   an extension arm forming a cantilever and connected to a refrigeration system downstream of an expansion valve of said refrigeration system, said extension arm amplifying vibrations generated by the refrigeration system when deficient in refrigerant,
   an accelerometer mounted on the extension arm for generating a signal when said extension arm is vibrated, and
   alarm means responsive to said signal for generating an alarm signal.

2. A device as claimed in claim 1 wherein said alarm means is a signalling device electrically connected to a power source, electrically connected to the accelerometer whereby a closed circuit is formed when said accelerometer is vibrated.

3. A device as claimed in claim 2 wherein said signalling is a light, an audible device or a combination of both.

4. A device as claimed in claim 3 wherein said extension arm is mounted onto a battery clip which is releasably attached to the refrigeration system.

5. A device as claimed in claim 4 wherein said alarm means is included within a computerized control system for controlling and monitoring the refrigeration system.

6. A device as claimed in claim 3 wherein said extension arm is rigidly affixed to the refrigeration system.

7. A device as claimed in claim 6 wherein said alarm means is included within a computerized control system for controlling and monitoring the refrigeration system.

* * * * *